Nov. 5, 1940.    N. AHLMANN    2,220,193

METHOD FOR AERATING CEMENT AND THE LIKE

Filed Oct. 2, 1937    2 Sheets-Sheet 1

INVENTOR
Nicolai Ahlmann
BY
ATTORNEYS

Nov. 5, 1940.  N. AHLMANN  2,220,193
METHOD FOR AERATING CEMENT AND THE LIKE
Filed Oct. 2, 1937  2 Sheets-Sheet 2

INVENTOR
Nikolai Ahlmann
BY
ATTORNEYS

Patented Nov. 5, 1940

2,220,193

UNITED STATES PATENT OFFICE 2,220,193

METHOD FOR AERATING CEMENT AND THE LIKE

Nikolai Ahlmann, Copenhagen, Denmark, assignor to F. L. Smidth & Company, New York, N. Y., a corporation of New Jersey Application October 2, 1937, Serial No. 167,042
In Great Britain October 5, 1936

6 Claims. (Cl. 34—24)

This invention relates to the cooling of ground hydraulic cement and is concerned more particularly with a novel method by which ground hydraulic cement may be cooled more rapidly and efficiently than has heretofore been possible.

Ground cement discharged from the grinding mill must be cooled before being placed in the storage silos and various methods and apparatus have been employed for the purpose. In certain forms of such apparatus, the ground product is cooled in a chamber which has a heat conducting wall, along one surface of which the cement is moved by appropriate means, while the other surface is cooled by means of a cooling medium, one form of apparatus of the type referred to being illustrated in my co-pending application, Serial No. 79,837, filed May 15, 1936. In the cooling operation carried on by the use of this and similar apparatus, difficulties have been encountered in keeping the cooler clean and in condition to effect good heat exchange. The cause of this difficulty is the condensation on the cooling surface of water vapor (including steam) present in the cement which causes the cement to stick to the surface. Even if the cement is ground entirely from dry clinker, such difficulties arise because gypsum is always ground in the mill with the clinker and part of the water of crystallization of the gypsum is converted into steam, which is present in the ground material discharged from the mill.

According to the present invention, these difficulties are overcome by removing the water vapor from the hot ground cement before it is cooled. For this purpose the cement, in its passage from the mill to the silos, is aerated in an appropriate manner to such an extent that the water vapor is displaced therefrom, and thereafter the cement is cooled in heat exchange apparatus of the type above referred to. The elimination of the water vapor from the hot material prevents it from sticking to the surfaces of the cooler and the efficiency of the cooling process is thereby greatly increased.

In the practice of the invention, the air used for aeration is preferably introduced into the cement under pressure but the displacement of the water vapor may be effected by the use of a vacuum, if desired. Also, since the cement must ordinarily be cooled somewhat before condensation takes place, it is within the scope of the invention to permit such initial cooling to occur and to remove the final part of the water vapor during the initial cooling.

The displacement of the water vapor or steam from the cement may be effected by introducing into the hot ground cement relatively small quantities of air which also aerate the cement and keep it fluent for a short time, or the cement may be conveyed pneumatically from the mill to the cooler, the aeration being effected by the air employed for conveying. In the first instance, the amount of air introduced into the cement depends upon the amount of water vapor to be expelled, but in general, from two to five litres of atmospheric air per kilogram of cement is sufficient. In the latter case, the amount of air usually employed for conveying cement pneumatically is of the order of 25 to 50 kilograms per kilogram of cement, and such an amount of air has been found sufficient in practice to remove substantially all of the water vapor from the cement before the latter reaches the cooling apparatus.

The method of the invention is quite different from that employed in cooling cement clinker issuing from the kiln. To cool clinker, the amount of air required is about one hundred times as great as that necessary to aerate cement and render it fluent by introduction of small quantities of air. Accordingly, the apparatus employed in the practice of the present invention may include a container for the cement, which has a few air nozzles through which air is blown at a sufficient velocity to prevent the cement falling through them, the total cross-sectional area of the nozzles amounting to only a small fraction of the total area of the portion of the container covered by the cement. With so few air nozzles in use, means are provided in the container for stirring the cement to effect the desired aeration and the aerated product leaving the container is then delivered to a cooler in which it passes along one surface of a heat conducting wall, the other surface of which is cooled by a cooling medium. Instead of employing a container with air nozzles, one wall of the container may be formed of porous material, the pores of which are so small that the cement cannot pass therethrough. Compressed air is then passed through the pores into the cement to aerate the latter.

In a modified form of the invention, the hot ground cement issuing from the mill is conveyed pneumatically to the cooler and the conveying system includes a cyclone or similar separator by which the air introduced into the cement is removed therefrom prior to the introduction of the cement into the cooler. In the use of this apparatus, the conveying air serves to aerate the cement and to displace the water vapor therefrom.

For a better understanding of the invention, reference may be had to the accompanying drawings, in which Figure 1 is a longitudinal sectional view of one form of aerating apparatus employed in practicing the invention;

Figure 1:
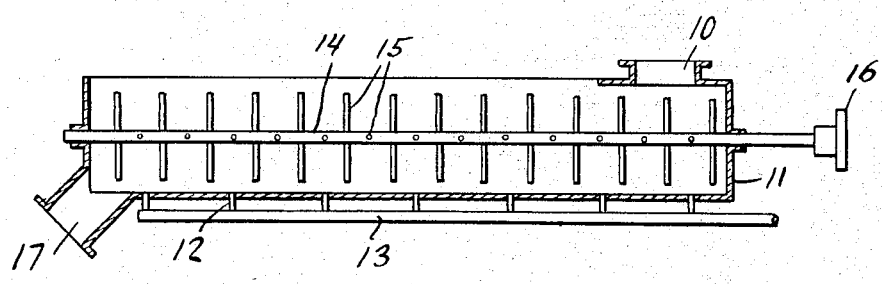

In the practice of the invention by means of the apparatus illustrated in Figure 1, the hot ground cement issuing from the mill is introduced through an inlet 10 into a trough-like container 11, in the lower wall of which are mounted air nozzles 12 supplied with air under pressure by a pipe 13. A shaft 14 is mounted in suitable bearings at the ends of the container to extend lengthwise of the latter and on this shaft are mounted stirring elements 15. The shaft is provided outside the container with a coupling 16 by which it may be connected to a source of power. At the end of the container opposite to that provided with the inlet is an outlet 17.

Figure 2:
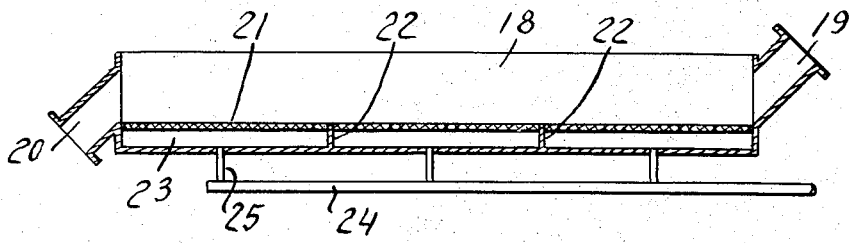
Figure 2 is a similar view of a modified form of aerating apparatus.

The apparatus illustrated in Figure 2 includes a trough-like container 18 having an inlet 19 and an outlet 20. Within the container above the lower wall thereof is an inner bottom wall 21 formed of porous material having very fine pores. Partitions 22 leading from the lower wall of the container to the inner porous wall subdivide the space between the walls into chambers 23 into each of which air is supplied under pressure by a pipe 24 having branches 25.

In the use of the apparatus shown in Figures 1 and 2, the hot ground cement from the mill is introduced into the container 11, 18 through the inlet thereof and moves along the container to the outlet 17, 20. Air is introduced into the layer of cement in the container in a quantity which is relatively small, but sufficient to effect the desired aeration of the material. The introduction of the air, as described, displaces the water vapor including steam present in the cement, the vapor escaping through the open top of the trough. In the apparatus shown in Figure 1, the air is introduced into the cement through a small number of nozzles and accordingly, to effect the desired aeration, a stirring means is provided. In the apparatus shown in Figure 2, the air is introduced into the cement through a multiplicity of fine pores and the distribution of the air is such that the desired aeration is accomplished without the use of stirring means.

The aerated cement issuing from either container, shown in Figures 1 and 2, is then conveyed to a cooler of suitable construction, in which the cement may move along one surface of a heat conducting wall, on the outer surface of which is maintained a cooling medium. Various types of apparatus may be employed for the purpose, such, for example, as that shown in my co-pending application above identified. The cooled cement issuing from the cooler is then delivered to the silo for storage.

Figure 3:
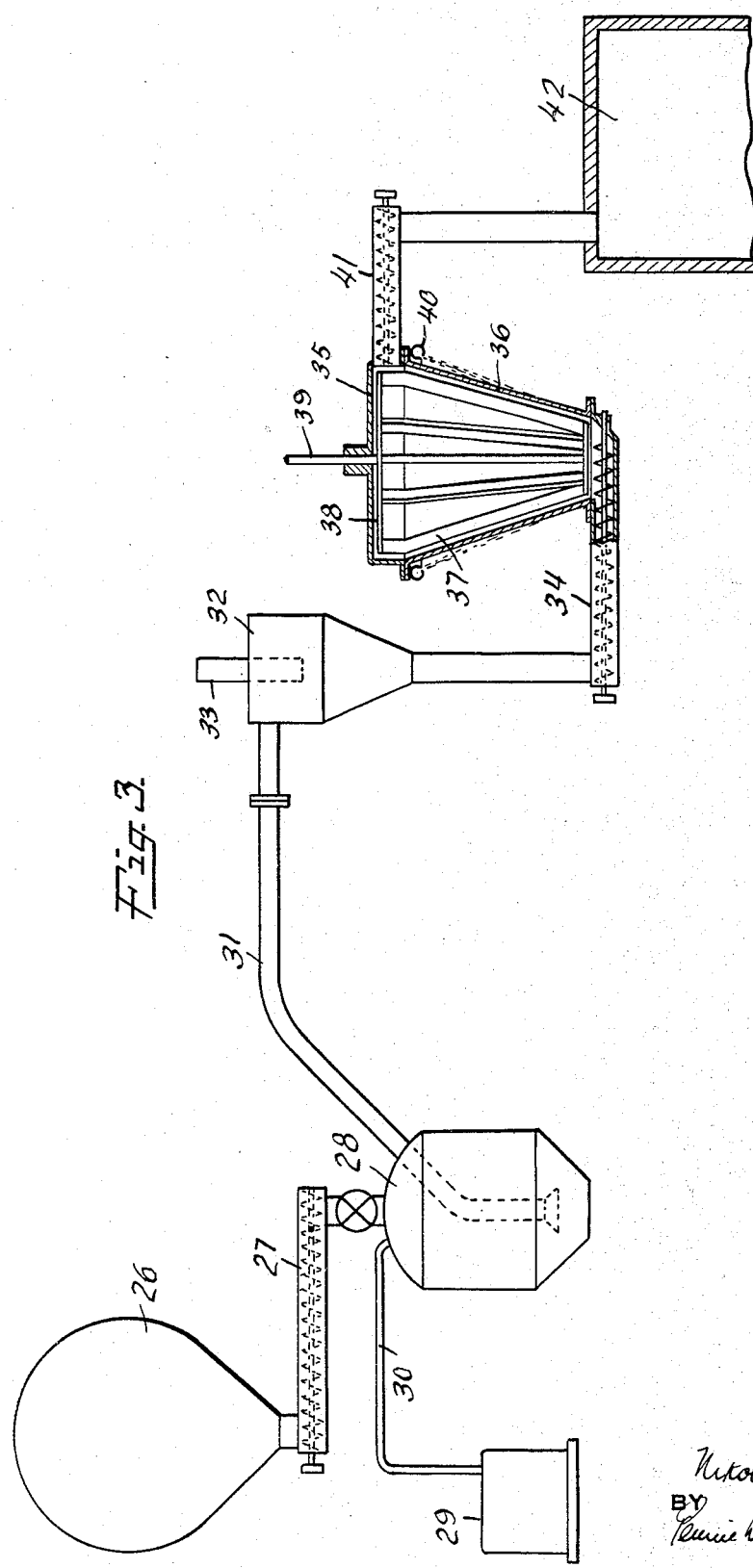
Figure 3 is a diagrammatic illustration of a form of apparatus used for practicing the invention, in which the cement is conveyed pneumatically.

In practicing the invention by the apparatus illustrated in Figure 3, the cement ground in the mill 26 is delivered by a suitable conveyer 27 into the conveying chamber 28 of a pneumatic conveying system. Compressed air is supplied to this chamber by a compresser 29 through a pipe 30, the air being admitted after the chamber is filled and serving to aerate the cement and discharge it through a conduit 31 leading to a separator 32, illustrated as being of the cyclone type. The greater part of the air then leaves the separator through the outlet 33, carrying with it substantially all the water vapor present in the cement when it left the mill 26. The cement itself leaves the separator through the bottom outlet and enters a conveyer 34 leading to a cooler 35. The cooler is illustrated diagrammatically in the drawings and, as shown, it includes wall 36 of generally conical shape with its smaller diameter at the lower end. The cement is fed into the lower end of the cooler and as it enters into the cooler, it is acted on by vanes 37 mounted on radial arms 38 on a shaft 39 so that the cement travels upward in a layer along the wall 36 in a helical path. The wall 36 is of heat conducting material and the cooling medium is maintained against its outer surface. For this purpose the cooler may be provided with water pipes 40 having discharge nozzles by which cooling water is delivered against the outer surface of the wall 36, and flows downwardly thereon. The cement which has been cooled in the cooler enters a conveyer 41 of conventional type and is conveyed thereby into a silo 42.

In the practice of the invention by any of the forms of apparatus disclosed, the ground cement discharged from the mill is transferred to storage and on the way to the silos, it is first aerated to displace the water vapor including steam therefrom and is then cooled by passage through a heat exchange type of cooler. Since the water vapor is substantially entirely removed from the cement before it enters the cooler, the cement has no tendency to adhere to the walls of the latter. As a consequence, proper flow of the cement through the cooler is obtained and the cooling is effected with high heat efficiency through the clean cooling surface.

I claim:

1. A method of cooling ground hydraulic cement which comprises introducing air into the hot ground cement to displace water vapor therefrom, and then passing the aerated cement in a thin layer along one surface of a heat-conducting wall and maintaining a cooling medium in contact with the other surface of the wall.

2. A method of cooling ground hydraulic cement which comprises introducing air in relatively small quantity into the hot ground cement to displace water vapor therefrom and render the cement fluent, and then passing the aerated cement in a thin layer along one surface of a heat-conducting wall and maintaining a cooling medium in contact with the other surface of the wall.

3. A method of cooling ground hydraulic cement which comprises transferring the hot ground cement from the place of grinding to a place of storage, and while the cement is thus being transferred, introducing air into it to displace water vapor therefrom, and thereafter withdrawing heat from the cement by passing the cement in a layer along a heat-conductive surface and maintaining the surface cool.

4. A method of cooling ground hydraulic cement which comprises moving the hot ground cement along a surface, introducing air through the surface into the cement in sufficient amount to displace water vapor from the cement, and then passing the cement along one surface of a heat-conducting wall and maintaining a cooling medium in contact with the other surface of the wall.

5. A method of cooling ground hydraulic cement which comprises conveying the hot ground cement from the place where the grinding was done, introducing air into the cement being conveyed to displace water vapor therefrom, and thereafter moving the aerated cement along a surface and withdrawing heat from the cement through the surface.

6. A method of cooling ground hydraulic cement which comprises conveying the ground cement in suspension in air from the place where the grinding was done, separating the cement from the conveying air and water vapor, and thereafter moving the aerated cement along a surface and withdrawing heat from the cement through the surface.

NIKOLAI AHLMANN.